(12) United States Patent
Sawalski et al.

(10) Patent No.: US 11,754,279 B2
(45) Date of Patent: Sep. 12, 2023

(54) REPELLANT STRING LIGHT

(71) Applicant: Lamplight Farms Incorporated, Menomonee Falls, WI (US)

(72) Inventors: Michael Sawalski, Racine, WI (US); Jessica Lindquist, Hartland, WI (US); Jason Tilk, Cleveland, OH (US); Jim Szpak, Cleveland, OH (US); Michael Bilinski, Cleveland, OH (US); Gary Stephan, Cleveland, OH (US); Jeffrey Crull, McFarland, WI (US); William Mathias, Middleton, WI (US); Evan Sparks, Cottage Grove, WI (US)

(*) Notice: Subject to any disclaimer, the term of this patent is extended or adjusted under 35 U.S.C. 154(b) by 0 days.

(21) Appl. No.: 17/101,827

(22) Filed: Nov. 23, 2020

(65) Prior Publication Data

US 2021/0148562 A1 May 20, 2021

Related U.S. Application Data

(63) Continuation-in-part of application No. 16/532,128, filed on Aug. 5, 2019, now Pat. No. 10,962,219.

(60) Provisional application No. 62/714,347, filed on Aug. 3, 2018.

(51) Int. Cl.
*F21V 33/00* (2006.01)
*F21V 23/00* (2015.01)
*F21S 4/10* (2016.01)
*A01M 13/00* (2006.01)

(52) U.S. Cl.
CPC ......... *F21V 33/0092* (2013.01); *A01M 13/00* (2013.01); *F21S 4/10* (2016.01); *F21V 23/001* (2013.01)

(58) Field of Classification Search
CPC ...... F21V 33/0092; F21V 23/001; F21S 4/10; A01M 13/00
USPC ............................................. 362/96
See application file for complete search history.

(56) References Cited

U.S. PATENT DOCUMENTS

| 596,764 | A | * | 1/1898 | Tolman ..................... F21S 4/10 |
| 2,468,164 | A | | 4/1949 | Brewster |
| 4,647,433 | A | | 3/1987 | Spector |
| 5,513,081 | A | | 4/1996 | Byers |
| 5,700,430 | A | | 12/1997 | Bonnema et al. |
| 5,967,644 | A | | 10/1999 | Pan |
| 6,033,212 | A | | 3/2000 | Bonnema et al. |

(Continued)

FOREIGN PATENT DOCUMENTS

| CN | 101418926 B | 6/2010 |
| CN | 101526206 B | 7/2010 |

(Continued)

OTHER PUBLICATIONS

Griffin M. Dill, IPM, "Cooperative Extension: Insect Pests, Ticks and Plant Diseases", Pest Management Fact Sheet, 00/00/2011, vol. 5108, Publisher: The University of Maine, Published in: Orono.

(Continued)

*Primary Examiner* — Bryon T Gyllstrom
(74) *Attorney, Agent, or Firm* — GableGotwals; David G. Woodral

(57) ABSTRACT

A system includes a first power cord and at least one heated repellant dispersal unit electrically connected to the first power cord that increases an evaporation rate of a repellant within the heated repellant dispersal unit.

1 Claim, 10 Drawing Sheets

(56) References Cited

U.S. PATENT DOCUMENTS

| | | | |
|---|---|---|---|
| 6,044,202 | A | 3/2000 | Junkel |
| 6,109,765 | A | 8/2000 | Blanton |
| 6,935,762 | B2 | 8/2005 | Van Dyn Hoven |
| 7,040,783 | B1* | 5/2006 | Christianson .............. F21L 4/04 |
| 7,318,659 | B2 | 1/2008 | Demarest et al. |
| 7,503,675 | B2 | 3/2009 | Demarest et al. |
| 7,581,851 | B2 | 9/2009 | Wang |
| 7,618,151 | B2 | 11/2009 | Abbondanzio et al. |
| 7,815,328 | B2 | 10/2010 | Van Dyn Hoven |
| 7,641,364 | B2 | 11/2010 | Abbondanzio et al. |
| 7,835,631 | B2 | 11/2010 | Wang |
| 8,480,248 | B2 | 7/2013 | Demarest et al. |
| 8,494,351 | B1 | 7/2013 | Hayes |
| 8,579,453 | B1 | 11/2013 | Cohen et al. |
| 8,616,735 | B2 | 12/2013 | Van Dyn Hoven |
| 8,772,675 | B2 | 7/2014 | Juarez |
| 9,497,958 | B2 | 11/2016 | Shapiro et al. |
| 9,591,843 | B2 | 3/2017 | Formico et al. |
| 9,968,080 | B1 | 5/2018 | Van Kleef et al. |
| 2001/0012495 | A1 | 8/2001 | Furner et al. |
| 2005/0195600 | A1 | 9/2005 | Porchia et al. |
| 2006/0219962 | A1 | 10/2006 | Dancs et al. |
| 2006/0221614 | A1 | 10/2006 | Van Dyn Hoven |
| 2007/0109763 | A1 | 5/2007 | Wolf et al. |
| 2007/0109782 | A1 | 5/2007 | Wolf et al. |
| 2007/0121319 | A1* | 5/2007 | Wolf .................. A01M 1/2083 |
| 2007/0133206 | A1 | 6/2007 | Demarest et al. |
| 2008/0112857 | A1 | 5/2008 | McKenzie-Jones et al. |
| 2008/0144325 | A1 | 6/2008 | Van Dyn Hoven |
| 2013/0114244 | A1 | 5/2013 | Formico et al. |
| 2014/0092589 | A1 | 4/2014 | Van Dyn Hoven |
| 2014/0268651 | A1 | 9/2014 | Mumma et al. |
| 2014/0369031 | A1* | 12/2014 | Livesay ..................... F21S 8/04 |
| 2015/0144712 | A1 | 5/2015 | Formico et al. |
| 2015/0144713 | A1 | 5/2015 | Formico et al. |
| 2015/0217016 | A1 | 8/2015 | McKay et al. |
| 2018/0348108 | A1 | 12/2018 | Khazaai et al. |

FOREIGN PATENT DOCUMENTS

| | | |
|---|---|---|
| CN | 203384946 U | 1/2014 |
| CN | 203718399 U | 7/2014 |
| CN | 203963798 U | 11/2014 |
| CN | 204592954 U | 8/2015 |
| CN | 204648023 U | 9/2015 |
| CN | 205756835 U | 12/2016 |
| CN | 107883229 A | 4/2018 |
| CN | 207539677 U | 6/2018 |
| IN | 1282MUMNP2009 | 3/2010 |
| WO | 2006126139 A1 | 11/2006 |
| WO | 200920568 A1 | 2/2009 |
| WO | 201060239 A1 | 6/2010 |

OTHER PUBLICATIONS

"Old unproven ultrasonic repellant emerges in a new form", Mosquito Repellent Apps: Do Ultrasonic Sound Devices Work?, 00/00/2019, Publisher: MosquitoReviews.com.

Chen CC, Azahari AH, Saadiyah I, Lee HL, "Preliminary study on the effectiveness of mosquito repelling lamp, E Da.", Trap Biomed., Dec. 24, 2007, pp. 89-91, vol. 24, No. 2, Publisher: PubMed.

Bentley, Michael T., et al., "Response Of Adult Mosquitoes To Light-Emitting Diodes Placed In Resting Boxes And In The Field", Journal of the American Mosquito Control Association, 00/00/2009, p. 285291, vol. 25, No. 3, Publisher: The American Mosquito Control Association, Inc, Published in: US.

Fiona Mcdonald, "This Is The Type of Light Bulb to Use if You Want to Avoid Attracting Insects", https://www.sciencealert.com/scientists-have-figured-out-the-type-of-light-bulb-to-use-if-you-want-to-avoid-insects, Feb. 22, 2016, Publisher: Science Alert, Published in: US.

Liu, Yu-Nan, "Enhancement of mosquito trapping efficiency by using pulse width modulated light emitting diodes", Jan. 6, 2017, vol. 7, No. 40074, Publisher: Scientific Reports, Published in: US.

Wikipedia, "Electronic pest control", https://en.wikipedia.org/wiki/Electronic_pest_control, Unknown, Published in: US.

\* cited by examiner

REPELLANT STRING LIGHT

CROSS-REFERENCE TO RELATED CASES

This application is a Continuation-in-Part of U.S. patent application Ser. No. 16/532,128, filed on Aug. 5, 2019 which claims the benefit of U.S. provisional patent application Ser. No. 62/714,347, filed on Aug. 3, 2018, and incorporates such provisional application by reference into this disclosure as if fully set out at this point.

FIELD OF THE INVENTION

This disclosure relates to outdoor devices having multiple uses. In particular, but not by way of limitation, this disclosure relates to devices providing light and dispersal of scents and/or repellants.

BACKGROUND OF THE INVENTION

Outdoor party lights or string lights have become common for lighting or decorative purposes. These may be based upon low wattage lights such as LEDs (light emitting diodes). However, their utility has remained static for some time and they have not generally been put to further uses.

Dispersion of repellants via electrical power, or plug-in devices, can enhance delivery of effective repellants. However, utility may be limited where battery power is required or where location of use has been restricted to locations very near an outlet. Additionally, for maximum effect with a repellant, it should be placed where it has the greatest exposure to the area sought to be protected.

What is needed is a system and method for addressing the above and related concerns.

SUMMARY OF THE INVENTION

The invention of the present disclosure, in one aspect thereof, comprises a system having a first power cord, and at least one heated repellant dispersal unit electrically connected to the first power cord that increases an evaporation rate of a repellant within the heated repellant dispersal unit.

In some embodiments, the first power cord does not have a manual power switch to activate or deactivate the at least one heated repellent dispersion port. In some cases, the first power cord is electrically connected to a wireless power coupler. The at least one heated repellant dispersion port may be electrically connected to the first power cord via a wireless power coupler.

The system may further comprise a second power cord physically connected to, but electrically isolated from, the first power cord, the second power cord having at least one light receptacle thereon. The first and second power cords may be physically connected such that the at least one heated repellant dispersal unit disperses repellent into an area lighted by a bulb in the at least one light receptacle. In some embodiments, the system further comprises at least one clip-on light having a clip that is sized to selectively attach to the first power cord, and further containing a battery that powers at attached light bulb.

The invention of the present disclosure, in another aspect thereof, comprises a system including a first power cord, a plurality of heated repellant dispersal units electrically connected to the first power cord that increase an evaporation rate of a repellant within the heated repellant dispersal units; and a plurality of light receptacles affixed to the first power cord such that the light receptacles illuminate an area below the power cord into which the plurality of heated repellant dispersion ports disperse repellent.

In some embodiments, the plurality of light receptacles is powered by the first power cord, in others they are not. The plurality of light receptacles may be powered by a second electrical power cord physically connected to but electrically isolated from the first electrical power cord. In some cases, the plurality of light receptacles is battery powered. In some cases, the plurality of light receptacles are affixed to the first power cord via detachable clips.

In some embodiments, the plurality of heated repellant dispersal units each contain one or more floats visible outside the plurality of heated repellant dispersal units indicating a level of a repellant contained in the respective heated repellant dispersal unit.

The first power cord may have a wireless coupling to a household power outlet. The plurality of heated repellant dispersal units may be electrically connected to the first power cord via a wireless coupling.

The invention of the present disclosure, in another aspect thereof, comprises a method including providing a first power cord, and electrically connecting a plurality of heated repellant dispersal units to the first power cord. The plurality of heated repellent dispersal units increases an evaporation rate of a repellant within the plurality of heated repellant dispersal units. The method includes arranging the power cord over an area to be protected by the repellant such that the entire area is infused by repellant from at least one of the heated repellent dispersal units, or is protected by intrusion from pests by an area infused by repellant from at least one of the heated repellent dispersal units.

In some embodiments, the method also comprises providing a plurality of light receptacles on the first power cord such that at least part of the area to be protected is lighted by the plurality of light receptacles. The method may further comprise providing a second power cord, physically attaching the second power cord to the first power cord while keeping the first and second power cords electrically isolated, and powering the plurality of light receptacles via the second power cord. In other cases, the method may include attaching the plurality of light receptacles to the first power cord via a detachable clip, and powering the light receptacles via a plurality of internal batteries.

DETAILED DESCRIPTION OF THE PREFERRED EMBODIMENTS

Figure 1:
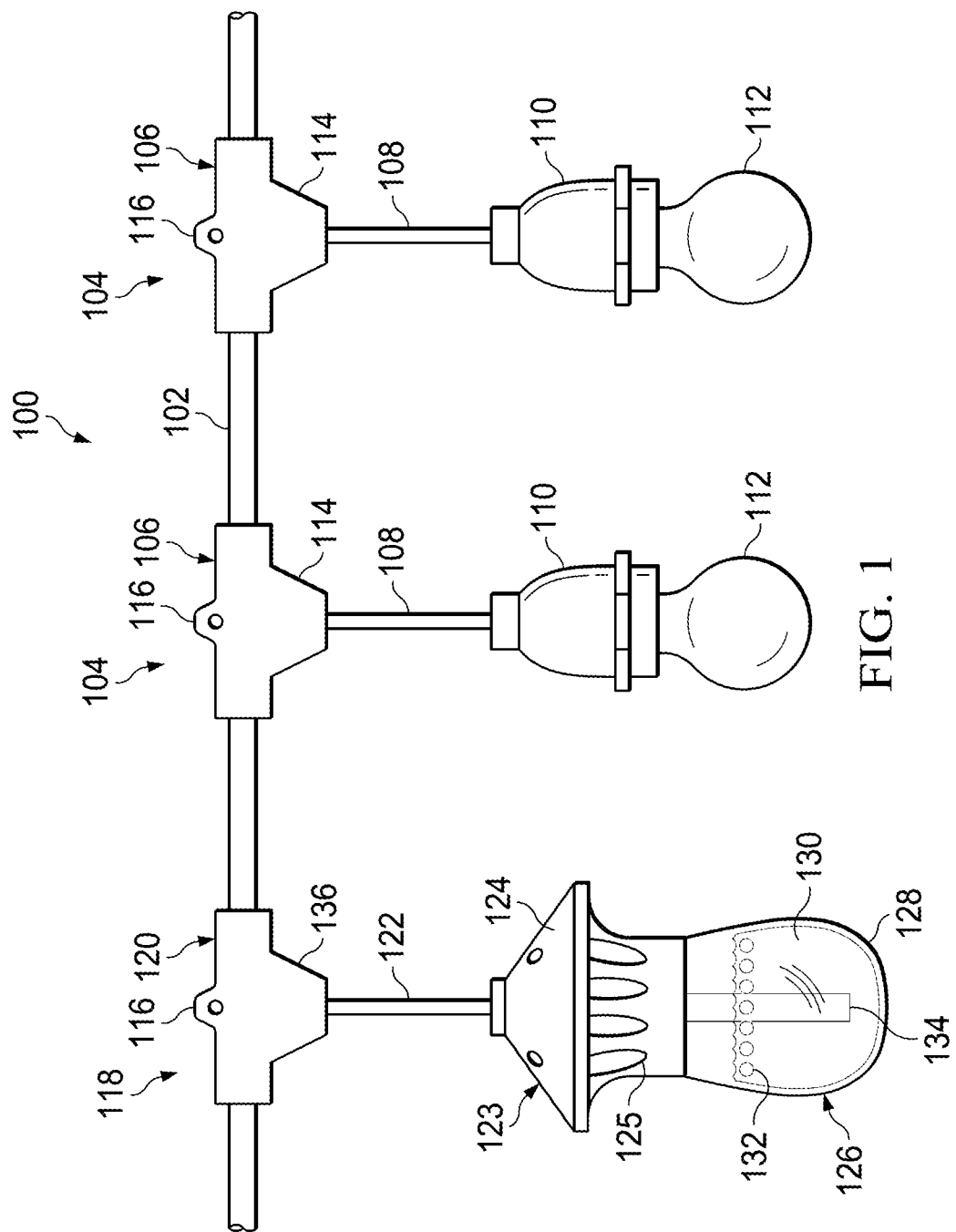
FIG. 1 is a close-up elevational view of a portion of a lighting and dispersal system according to aspects of the present disclosure.

Referring now to FIG. 1, a close-up elevational view of a portion of a lighting and dispersal system 100 according to aspects of the present disclosure is shown. The system 100 is a combination light string and liquid volatilization and dispersal mechanism. Systems of the present disclosure may disperse repellants, scents, oils, chemicals etc., while providing lighting or decorative effects. The system 100 provides a power cord 102 with a plurality of light receptacles 104 spaced along the cord 102. The light receptacles 104 may further each comprise a cord junction 106 with a segment of transverse power cord 108 leading from the junction to a light socket 110. In some embodiments, the light socket 110 is affixed directly to the cord junction 106 (i.e., there is no transverse power cord 108).

The junction 106 provides an internal electrical splice to the power cord 102, which may power a light bulb 112 inserted into the socket 110. The junction 106 may comprise a body 114 that may be constructed of an insulating polymer or another material. The junction 106 may comprise a hang loop 116 defined in or attached to the body 114.

In various embodiments, the light socket 110 may comprise a screw in base such as an E26/E27 base or another base such as E12, E14, E17, E39/E40. In some embodiments, the light socket 110 may comprise a bayonet or press-in style socket. The light bulb 112 may comprise an incandescent light bulb, a compact fluorescent (CFL) bulb, or a light emitting diode (LED) in a form factor to fit the associated socket 110. In one embodiment, the light bulb 112 comprises a 2-watt LED.

In addition to one or a plurality of light receptacles 104, the system 100 comprises one or a plurality of repellant dispersion ports 118. The repellant dispersion ports 118 may each comprise a cord junction 120 connecting a transverse power cord segment 122 to a heating receptacle 123. The cord junction 120 contains body 126 covering an electrical splice from the power cord 102 to supply power to the heating receptacle 123. The body 126 may comprise an insulating polymer. In some embodiments, the heating receptacle 123 is affixed directly to the cord junction 120 (i.e., there is no transverse power cord 122).

The heating receptacle 123 may attach selectively to a repellant assembly 126. The pod 126 may removably inserted into or attach to the receptacle 124 with a threaded connection, a turn and lock connected, a press fit mechanism, a bayonet style connected, a magnetic fitting, or another operable mechanism. The heating receptacle 123 applies heat to the repellant assembly 126 to volatilize and disperse the contents of the pod 126. To that end, ventilation ports 125 may be defined in a body 124 comprising the heating receptacle 123. The body 124 may comprise a polymer or other suitable material.

The pod 126 may comprise a fluid pod 128 that contains a quantity of a pest or insect repellant product 130 such as a synthetic pyrethroid, metofluthrin, meperfluthin, or other product. The fluid pod 128 may also contain scents or other agents. The pod 126 may be provided to the consumer pre-filled and may or may not be serviceable for refilling by the consumer (e.g., the pod 126 may be considered a disposable item). The fluid pod 128 may comprise an opaque or tinted polymer. In some embodiments, the fluid pod 128 may be clear or at least translucent to allow the consumer to ascertain the amount of repellant 130 remaining in the pod 126.

Figure 6:
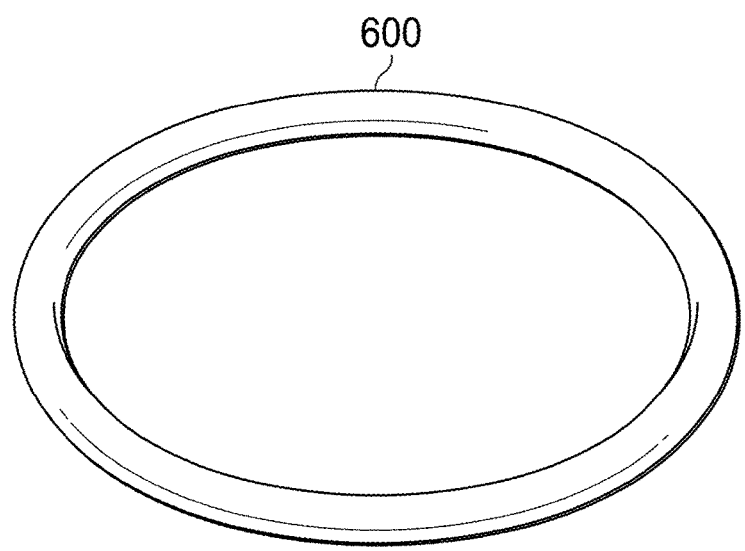
FIG. 6 is a perspective view of a repellant level indicator float ring according to aspects of the present disclosure.

In some cases, various lighting conditions and combinations of the appearance of the repellant 130 and the fluid pod 128 may render determination of the remaining amount of repellant 130 difficult. In some embodiments, a number of floats 132 may be provided in the repellant 130. In the case of small discrete floats 132 or beads, surface tensions of the repellant 130 and the geometry of the meniscus that forms at the top of the repellant layer results in the floats 132 tending to remain near the sides of the repellant bulb 128 such that the fluid level may be easily determined. In other embodiments, a toroidal ring-type float (600, FIG. 6) may be utilized.

Figure 2:
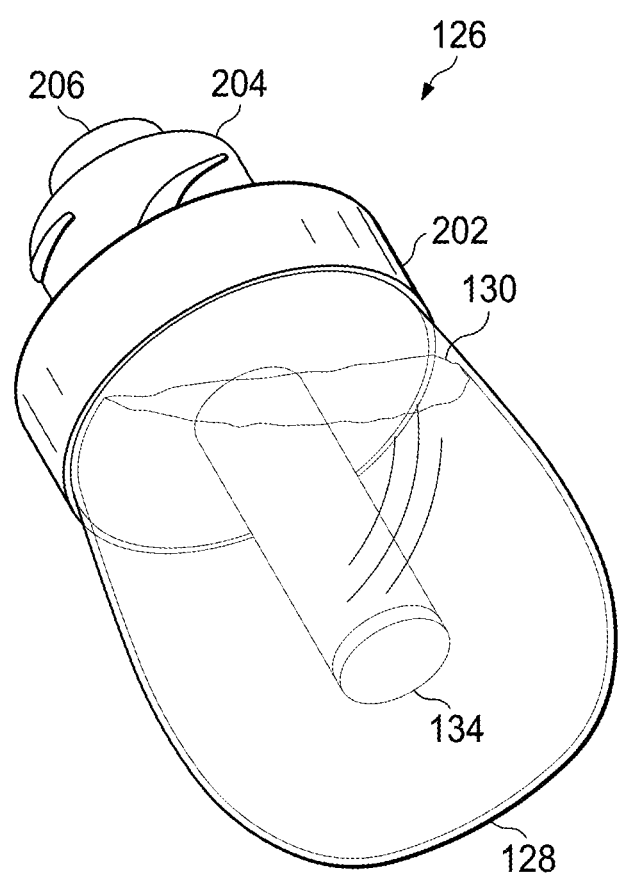
FIG. 2 is a perspective view of a repellant assembly according to aspects of the present disclosure.

Referring now also to FIG. 2 a perspective view of the repellant assembly 126 removed from the heating receptacle 123 is shown. It can be seen that no floats or fluid level indicators are provided in the view of FIG. 2 and that the fluid pod 128 is substantially full as it would appear before use (or after refill). A cap 202 may affix to the top of the fluid pod 128 to prevent spillage of the repellant 130. The cap 202 may provide a fitting 204 for selective attachment into the heating receptacle 123. Here the fitting 204 is illustrated as a threaded fitting. A top port 206 may be provided for passage or evaporation of the repellant 130. In one embodiment, a top of the wick 134 serves as a top port or evaporation pad.

Figure 3:
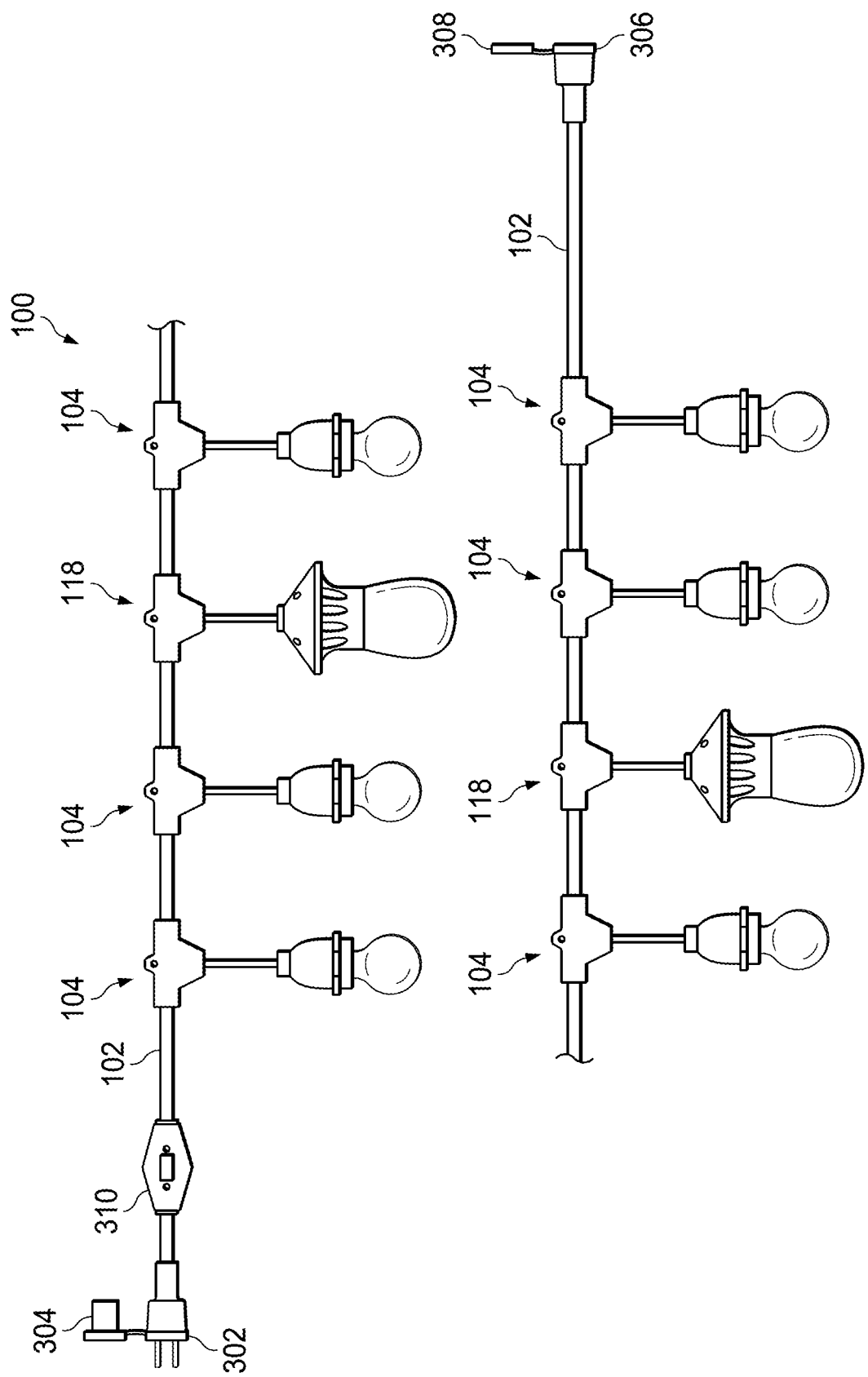
FIG. 3 is an elevational view of a lighting and dispersal system according to aspects of the present disclosure.

Referring now to FIG. 3 an elevational view of the lighting and dispersal system 100 is shown. FIG. 3 is not to scale, nor does it necessarily reflect the total number of light receptacles 104 and repellant dispersion ports 118 associated with the system 100. In some embodiments, there may be equal numbers of each. However, the repellant dispersion ports 118 may provide a wide enough effective repellant area that a relatively greater number of light receptacles 104 may be appropriate.

In one embodiment, power cord 102 may be around 36 feet in length. A total of three repellant dispersion ports 118 are provided along the power cord 102 with a total of twelve light receptacles 104. Various embodiments may be provided with a standard outlet plug 302 (e.g., a standard US/Canada or other type of plug), possibly with an attached cover 304. At an opposite end a standard female outlet 306 may be provided, possibly with an attached cover 308. A power switch 310 may be provided as well. The outlet 306 allows for multiple systems 100 to be chained together, or for the system 100 to provide "downstream" power to other devices.

Figure 4:
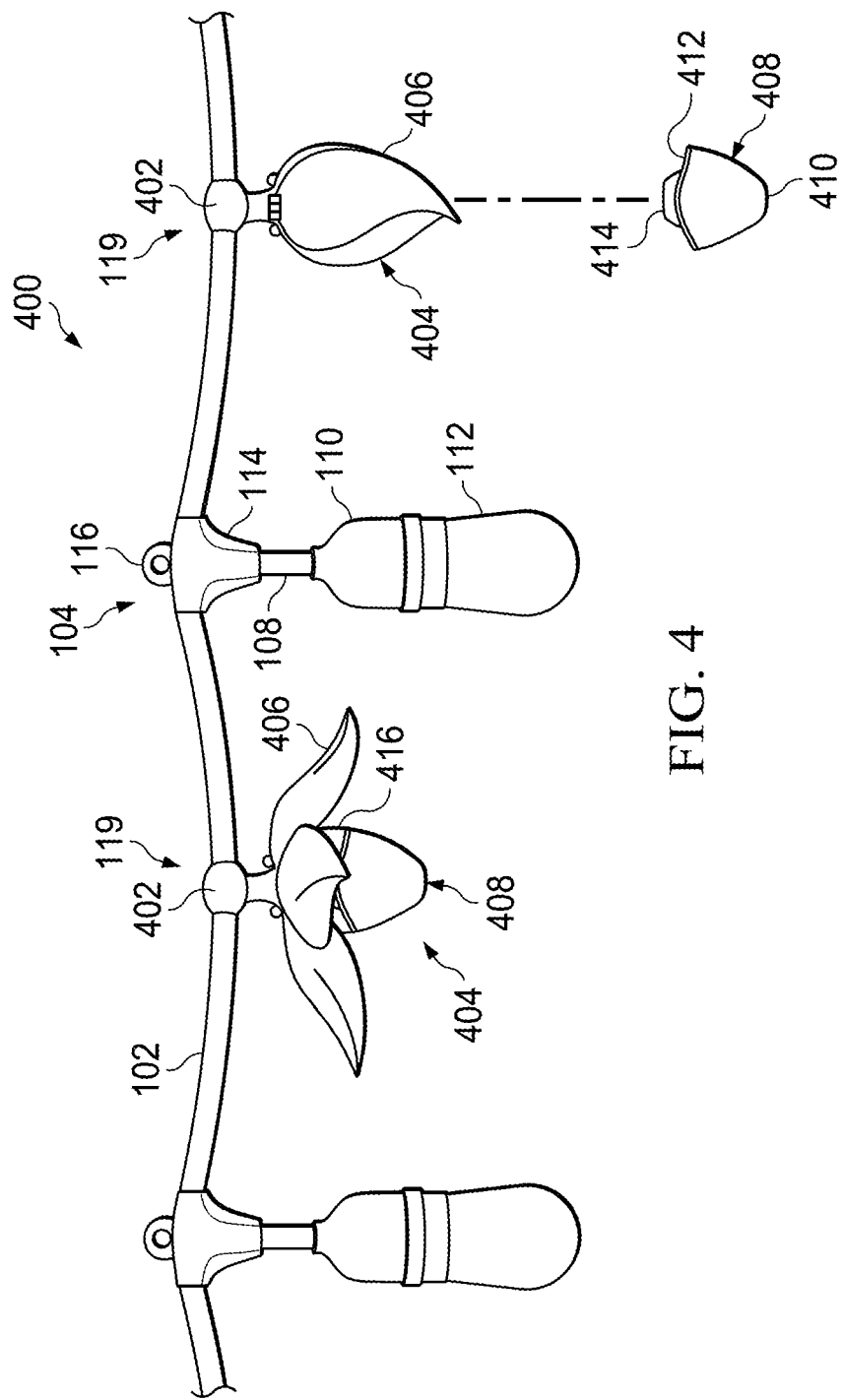
FIG. 4 is a close-up perspective view of another embodiment of a lighting and dispersal system according to aspects of the present disclosure.

Referring now to FIG. 4, a close-up perspective view of another embodiment of a lighting and dispersal system 400 according to aspects of the present disclosure is shown. The system 400 shares many components in common with the system 100 previously described. A power cord 102 provides a common source of power. One or more light receptacles 104 may be provided at various locations along the power cord 102. The power cord may have electrical connections at either end (not shown) as well as a power switch (not shown).

The system 400 comprises one or more repellant dispersion ports 119 that differ in some respects from the repellant dispersion ports 118 discussed previously. The repellant dispersion ports 119 comprise junctions 402 providing an internal power splice and affixing the repellant dispersion port 119 to the power cord 102. Here, the junction 402 also provides a heating element for promotion of evaporation of the associated repellant and other chemicals. A covering 404 selectively surrounds a repellant assembly 408 and heating receptacle 416. In some embodiments, the covering 404 resembles a flower with openable petals 406. The petals 406 may be opened manually to reveal the repellant assembly 408, they may open under a power mechanism, or they may be configured with a low enough mass and loose enough connections to be able to displace under light breezes to reveal the repellant assembly 408.

The repellant assembly 408 may contain any of the aforedescribed repellants or other ingredients, and may be refillable or disposable. As show in the inset, the repellant assembly 408 may include a fluid pod 410 that contains the repellant or other ingredients. The fluid pod 410 may be provided with a cap 412 that may provide a fitting 414 for attachment and detachment from the heating receptacle 416. A wick (not visible) may provide a pathway for movement of the repellant from the fluid pod 410 for dispersion/evaporation by the heating receptacle 416.

Figure 5:
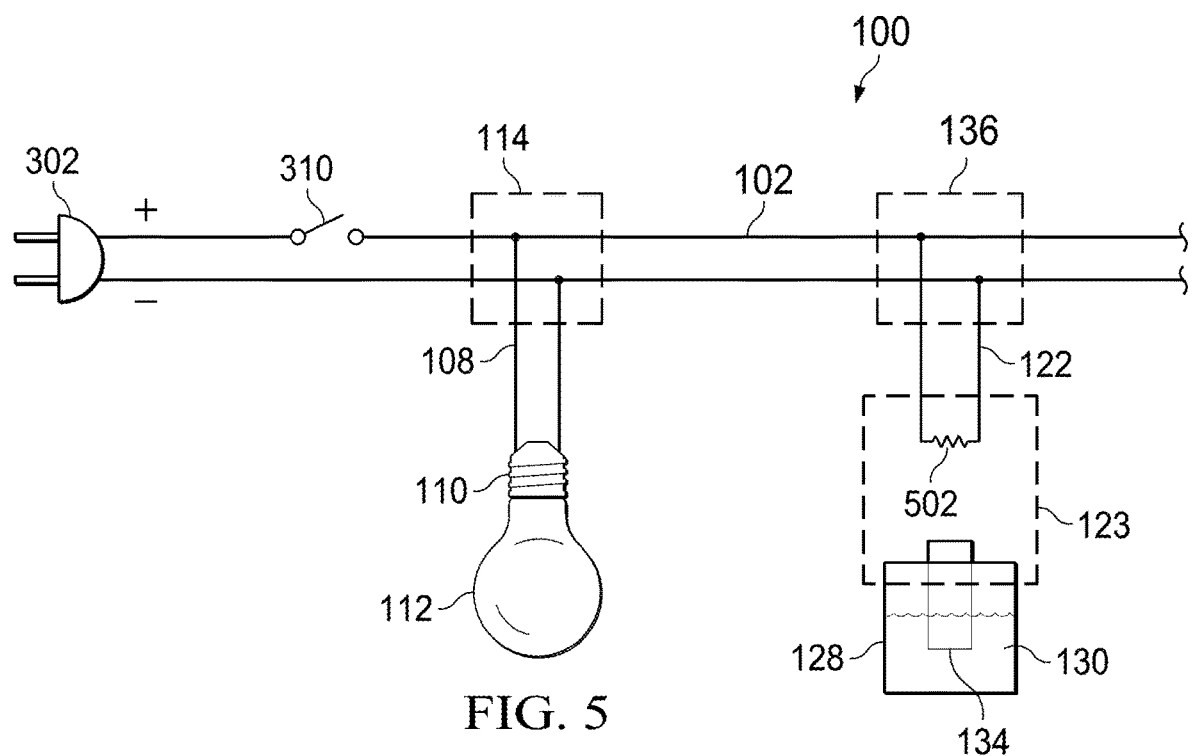
FIG. 5 is a simplified electrical schematic diagram of a lighting and dispersal system according to aspects of the present disclosure.

Referring now to FIG. 5 a simplified electrical schematic diagram of a lighting and dispersal system according to aspects of the present disclosure is shown. FIG. 5 corresponds particularly to the system 100. However, those of skill in the art will appreciate that the schematic is easily adapted to the system 200, or any of the additional embodiments discussed herein. The plug in 302 is shown providing power to the power cord 102, shown as positive and negative leads. Switch 310 controls the positive side of power cord 102. Junction body 114 contains the connecting nodes for transverse power cord 108 to supply current and voltage to light socket 112 and bulb 112.

Junction body 136 contains nodes connecting power cord 102 to transverse power cord 122 leading to the heating receptacle 123. A resistive heating element 502 exposes wick 134 (or at least the repellant) to elevated temperature to gasify or evaporate the same. In some embodiments the wattage of the resistive heating element 502 is less than 8 watts. In another embodiment, the wattage of resistive element 502 is 5 watts or about 5 watts. The temperature provided by the resistive heating element 502 may be from about 120 C to about 140 C.

It should be understood that the arrangement of the components shown in FIG. 5 may be replicated as far as necessary to properly configure each associate lighting receptacle and repellant dispersion port. The system 100 may be configured with the appropriately rated components to operate from about 100V to about 240V. It should also be understood that, in some embodiments, lighting and repellant functions are isolated along the power cord 102. In other words, in some embodiments, the light receptacles 104 are divorced from dispersion of any repellants or other chemicals and are, instead, dedicated to providing only light. Correspondingly, in some embodiments, repellant dispersion ports 118 do not provide any useable light.

In operation, the systems described herein (e.g., system 100 and system 400) may be installed such that they are somewhere above ground level to allow maximum effectiveness of the repellant. In various embodiments 4 feet to 12 feet provides an optimum effect and a repellant zone from mounting level all the way to the ground. The systems may be strung from a roof, fence, wall, tree, dedicated poles, or other structures. The systems 100, 400 are also described as being powered by a household outlet. However, it should be understood they may also be powered by batteries, generators, and other portable power sources.

Figure 7:
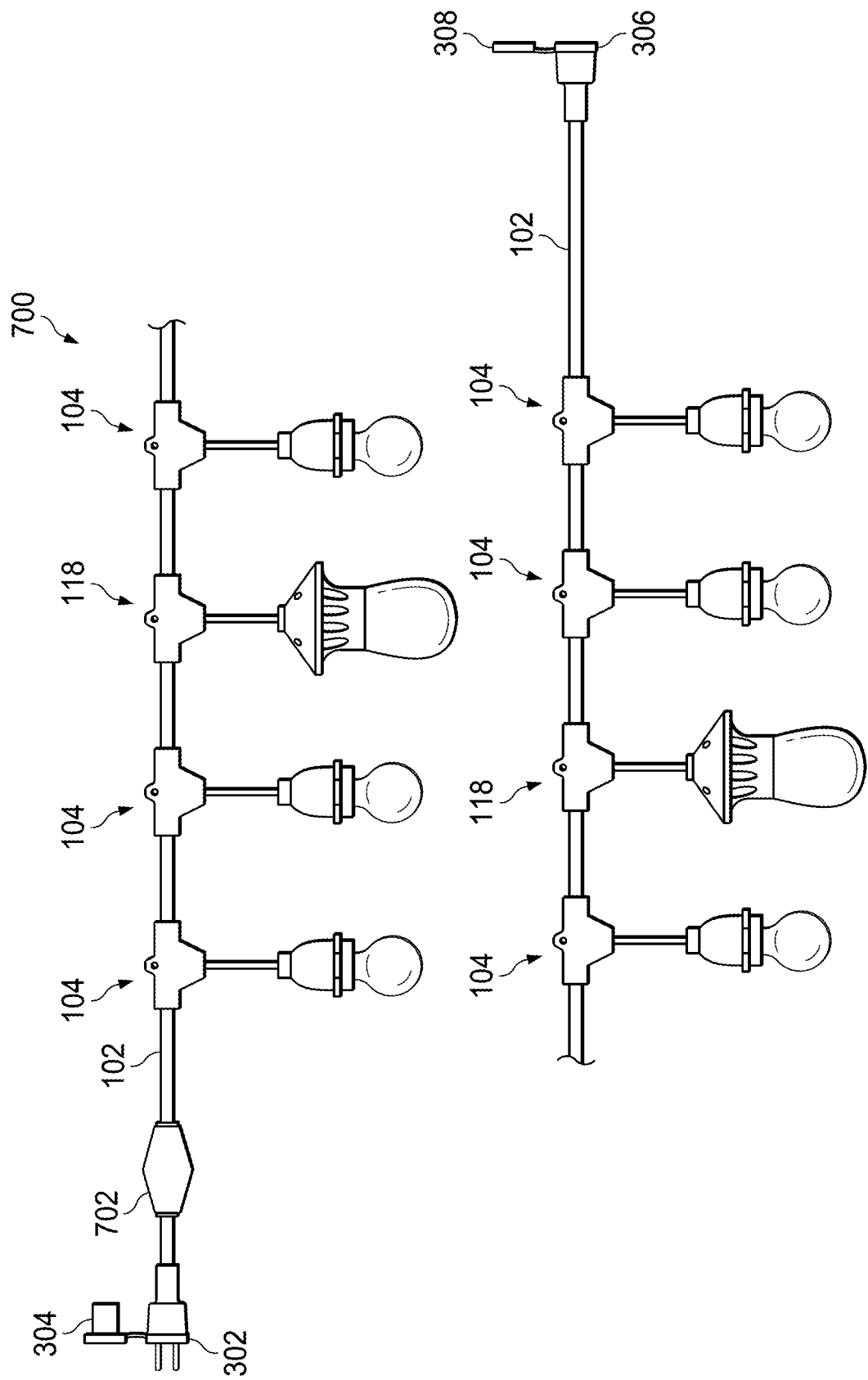
FIG. 7 is an elevational view of another embodiment of a lighting and dispersal system according to aspects of the present disclosure.

Referring now to FIG. 7, an elevational view of another embodiment of a lighting and dispersal system 700 according to aspects of the present disclosure is shown. The system 700 is similar to the system 100 described above but does not have a manual power switch (such as power switch 310). The system 700 may power on in response to being connected to power, via plug 302, for example. In some embodiments, a delay circuit, warmup circuit, current limiting, circuit and/or power conditioning circuit as known in the art may be provided in a circuit enclosure 702. Some embodiments to not provide such circuity nor the enclosure 702, but such circuitry may still be included with the specific light receptacles 104 and/or repellant dispersion ports 118 if and as needed. Fuses, as known in the art, may also be include if and where needed.

Figure 8:
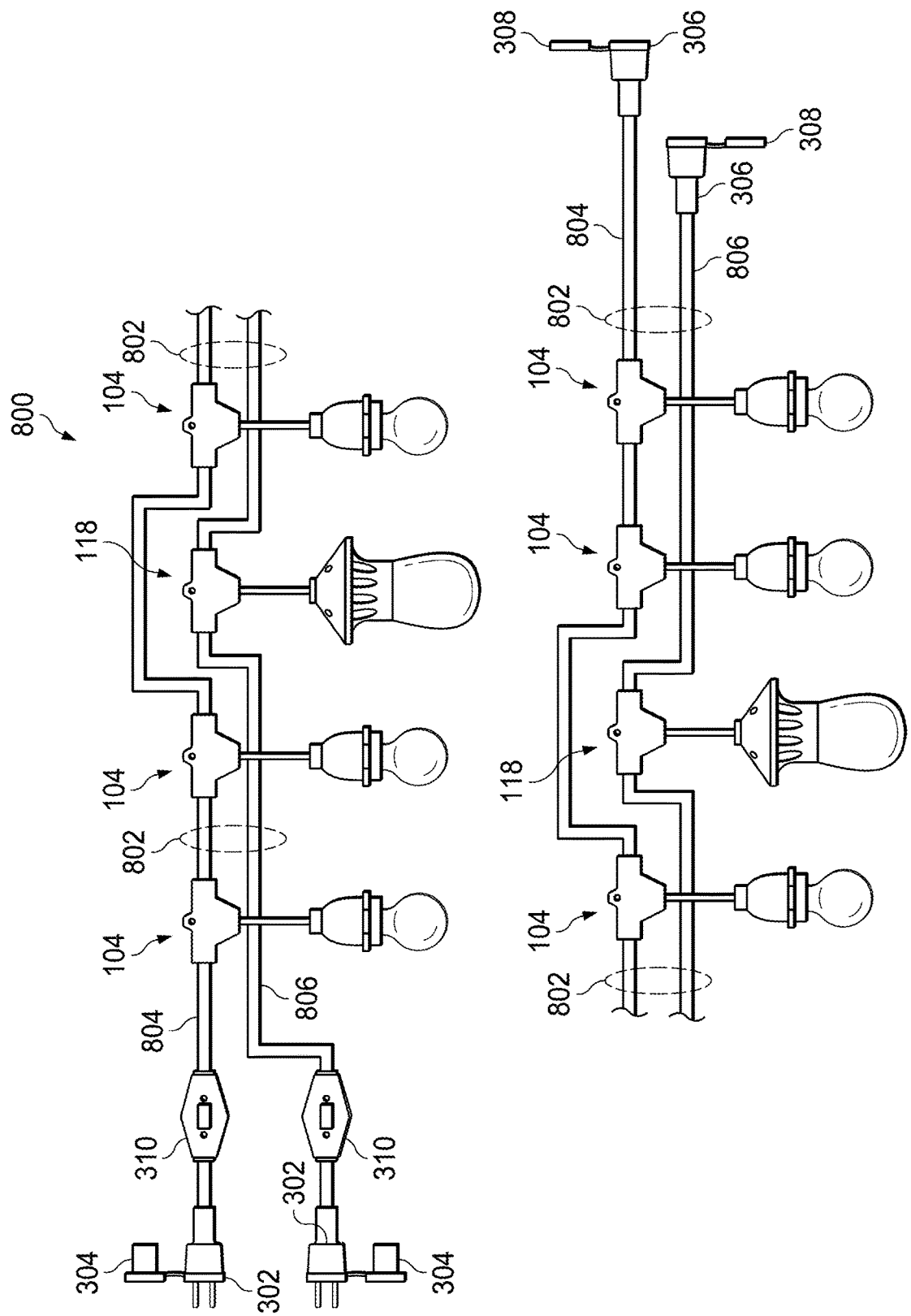
FIG. 8 is an exploded plan diagram of another embodiment of a lighting and dispersal system according to aspects of the present disclosure.

Referring now to FIG. 8 an exploded plan diagram of another embodiment of a lighting and dispersal system 800 according to aspects of the present disclosure is shown. The system 800 comprises both lighting and repellent dispersion on a single cord 802 but the functions of both are electrically separated or isolated. The system 800 comprises a first power line 804 that supplies power for a plurality of light receptacles 104 and a second power line 806 that supplies power for a plurality of repellant dispersion ports 118. The lines 804, 806 may be physically bound and/or wound together along medial portions thereof. They may have a separate outer wrapper (not shown) for weather resistance, insulation, appearance, and/or ease of handling. At ends of the lines 804, 806 they may split apart into separate plugs 302 and may separate into a pair of receptacles or outlets 306. Cord junctions (e.g., 106, 120, FIG. 1) and/or hang loops (e.g., 116, FIG. 1) and possibly other components may be available outside any wrapper or covering of the power lines 804, 806 as needed.

In some embodiments, each line 804, 806 has its own manual switch 310 such that dispersion and lighting functions are separately controllable. In other embodiments, one or both of the power lines 804, 806 may be provided with no manual switch 310 such that they are controlled by connection to power. In such case, either line 804, 806 may be provided with whatever adjunct circuity may otherwise be needed, as with the system 700 (e.g., delay circuit, warmup circuit, current limiting, circuit and/or power conditioning, etc.).

Figure 9:
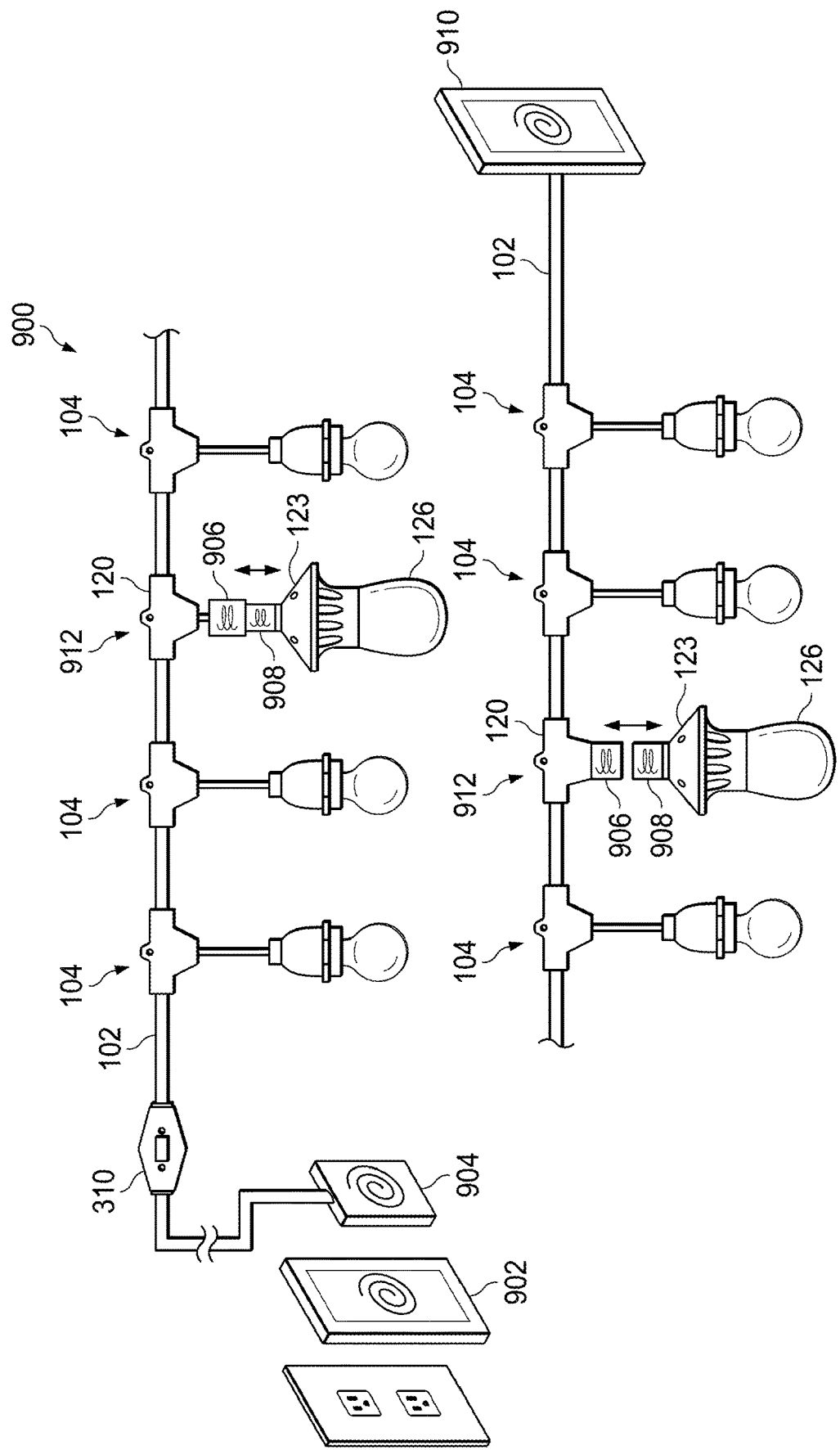
FIG. 9 is an elevational view of another embodiment of a lighting and dispersal system according to aspects of the present disclosure.

FIG. 9 is an elevational view of another embodiment of a lighting and dispersal system 900 according to aspects of the present disclosure. The system 900 is similar to the system 100 discussed above but utilizes wireless power couplings. It should also be understood that wireless power couplings can be utilized with any system according to the present disclosure. As illustrated, the system 900 may utilize a plug-in coil 902 that connects to household power. A line coil 904 is placed onto, in, or near the line coil 904 such that electric power is transferred thereto, and into the power cord 102. It should be understood that any wireless power transfer technology as is known in the art may be employed in this context. Nonlimiting examples include inductive, capacitive, and magnetodynamic coupling.

Dispersion ports 912 may also be adapted to utilize wireless power transfer but may otherwise operate similarly to dispersion ports 118 described above. For example, the ports 118 as shown in FIG. 8 utilize an inner coil coupling 908 affixed to heating receptacle 123 that fits into an outer coil coupling 906 that is electrically connected to the power cord 102 (possibly via cord junction 120). In the illustrated embodiment, the couplings 906, 908 provide for wireless power transfer from the power cord 102 to the receptacle 123 and also physically retain the receptacle 123 and associated pod 126 in place on the cord 102 and/or junction 120. Wireless power transfer may be any suitable known protocol or connection type (e.g., magnetic, inductive, etc.). The physical retention may be via interference fit, friction fit, securement latch, bayonet coupling, screw coupling, other mechanism.

Opposite from the line coil 904 on the power cord 102 may be an outlet plug in 910. This may extend the output provided by plug in coil 902 such that additional light/repellant strings or other devices can be daisy chained to the system 900. The system 900 may or may not include a manual power switch 310 and/or other power conditioning and needed operational circuitry as is known in the art.

It should also be understood that the light receptacles 104 may be configured to utilize wireless power couplings similar to the manner in which dispersion ports 118 (e.g., FIG. 1) are configured as dispersion ports 912.

Figure 10:
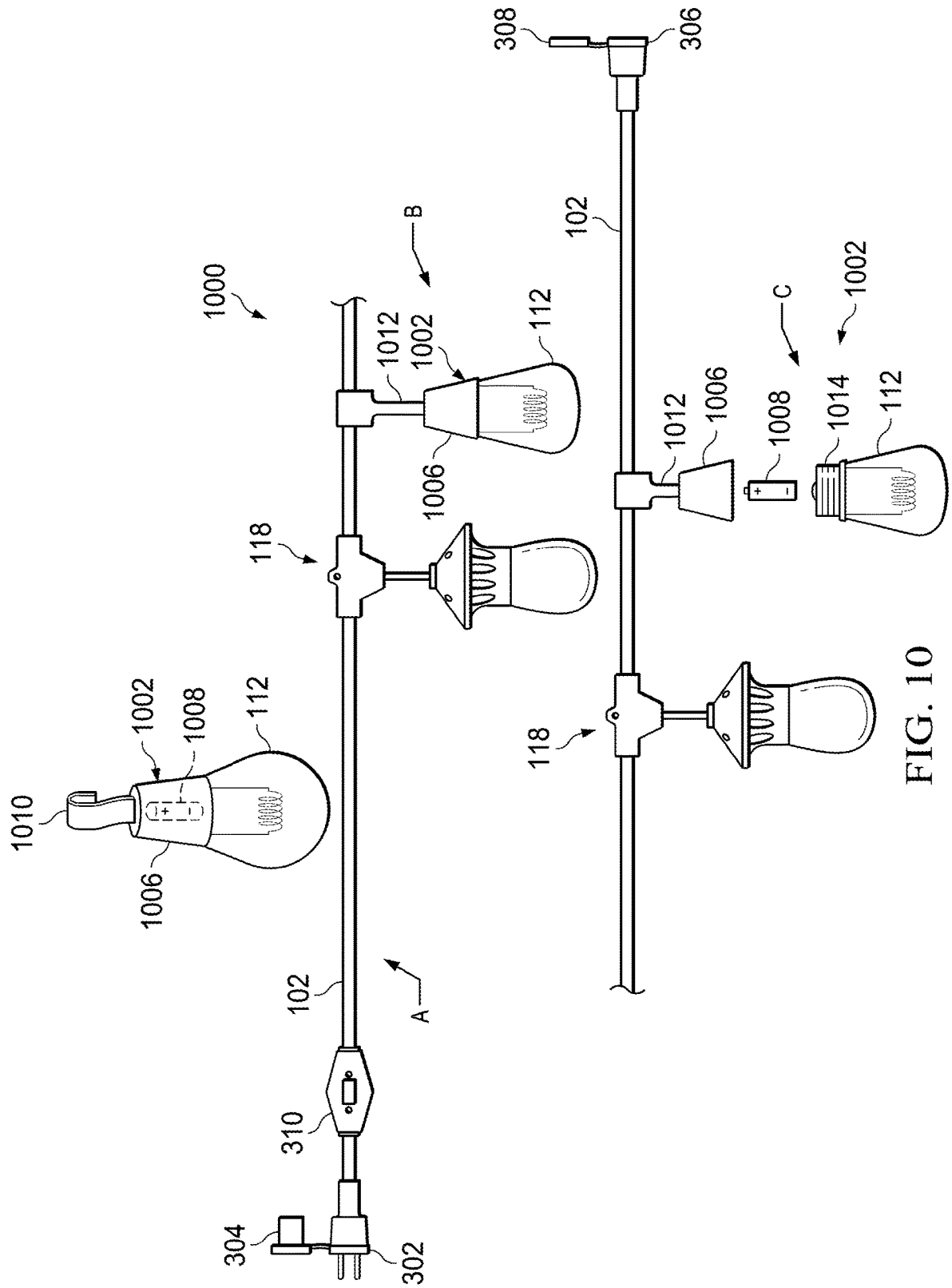
FIG. 10 is an exploded plan diagram of another embodiment of a lighting and dispersal system according to aspects of the present disclosure.

Referring now to FIG. 10, an exploded plan diagram of another embodiment of a lighting and dispersal system 1000 according to aspects of the present disclosure is shown. The system 1000 utilizes a power cord 102 (which may be equipped as in FIG. 3, or according to any other embodiment described herein) that has only repellent dispersion ports 118 rather than dispersion ports 118 and light receptacles. In another embodiment, the system 1000 has a cord 102 provided with light receptacles as well (e.g., 104, FIG. 1) but additional lighting is desired. The additional lighting may be the same or different from that provided via the receptacles 104 described above and may be provided via one or more clip-on lights 1002.

The clip-on lights 1002 may comprise a light bulb 112 as described above. The bulb 112 may be selectively retained and provided power by a housing 1006 with an internal battery 1008. The battery 1008 may be any battery providing a suitable voltage for the bulb 112 (whether LED or otherwise) and may be based on any suitable chemistry (e.g., alkaline, lithium ion, etc.). In some embodiments, the battery 1008 is rechargeable.

The housing 1006 has a clip 1010 affixed thereto that selectively retains the clip-on light 1002 on the cord 102. The clip may be sized for an interference fit or to "snap on" to the cord 102. The clip 1010 may comprise a polymer or another suitable material. It may also vary in size or length to provide proper positioning of the bulb 112 relative to the cord 102 and/or components of the repellant dispersion ports 118. Position A illustrates a relatively short clip 1010 while positions B and C illustrate a longer clip 1012 (which may otherwise be functionally identical to clip 1010).

Position C also illustrates a clip-on light 1002 in a disassembled configuration. Here the battery 1008 may be seen outside the housing 1006 and the bulb 112 detached from the housing 1006. It should be understood that internal springs for secure contact with the battery 1008 and circuitry as is known in the art for operation of the bulb 112 by the battery 1008 are included. The bulb 112 may be physically affixed to the housing 1006 by any suitable mechanism such as a bayonet style attachment, a friction fit, an interference fit, a press fit, a screw in fit, etc.

As described above the systems described herein (e.g., 100, 400, 700, 800, 900) may be installed such that they are somewhere above ground level to allow maximum effectiveness of the repellant. In a specific embodiment, these may be installed such that the repellant dispersion ports are a maximum of about 100 feet from the ground or support surface. In such case, each repellant dispersion port (e.g., 118) provides approximately a 330 square foot zone of protection from the respective port 118 down to the ground or support surface. Under mild conditions (e.g., low wind or no wind) the area of protection has a roughly circular appearance viewed from above.

Figure 11:
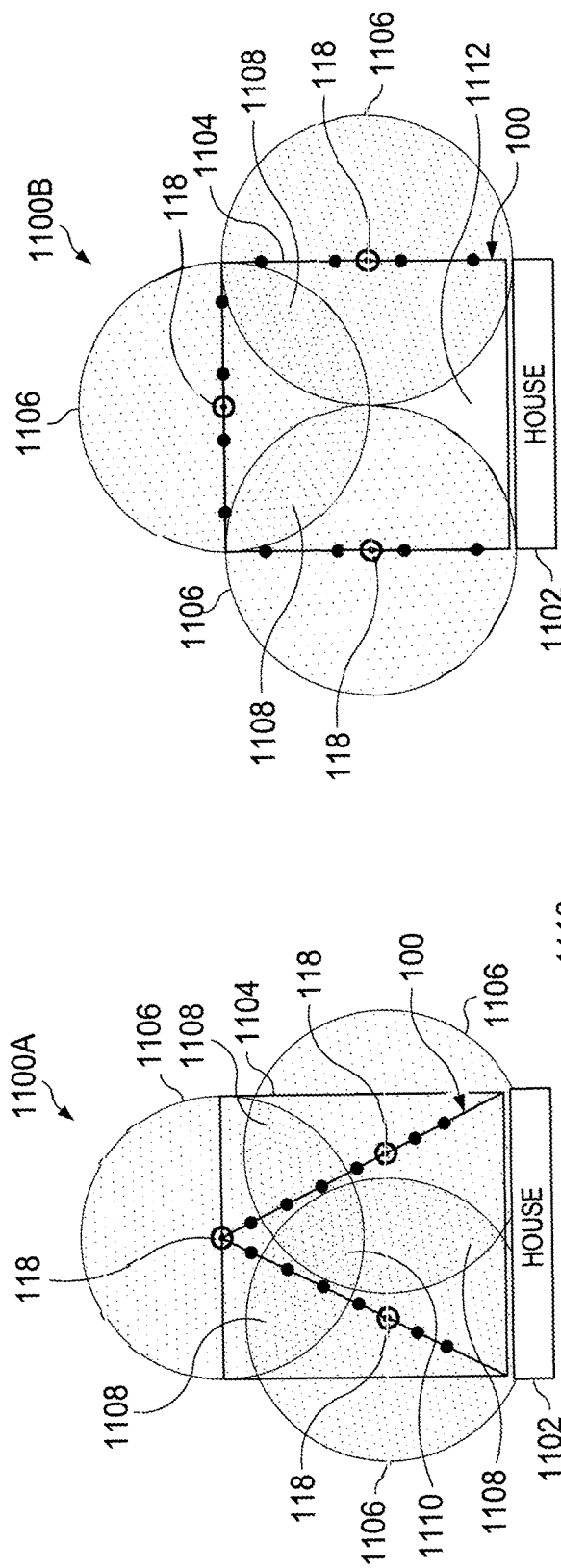
FIG. 11A is an overhead view of a plurality of repellent zones arranged in first plan according to aspects of the present disclosure.
FIG. 11B is an overhead view of a plurality of repellent zones arranged in first plan according to aspects of the present disclosure.
FIG. 11C is an overhead view of a plurality of repellent zones arranged in first plan according to aspects of the present disclosure.
FIG. 11D is an overhead view of a plurality of repellent zones arranged in first plan according to aspects of the present disclosure.
Figure 11:
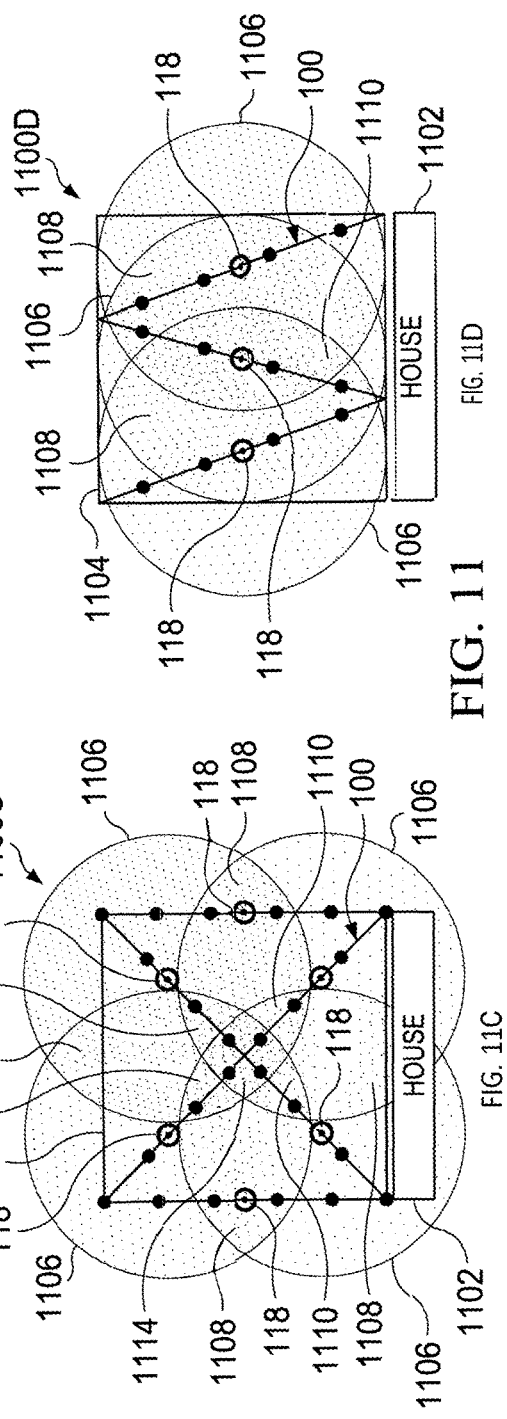
Figure 11:
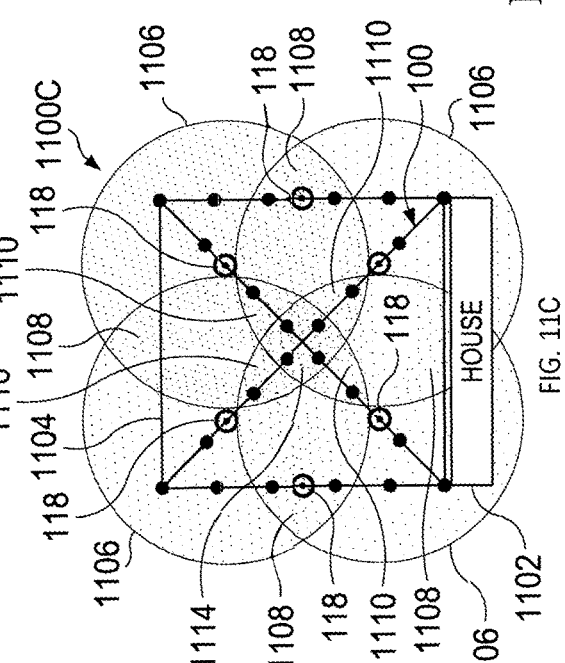

Referring now to FIG. 11A is an overhead view of a plurality of repellent zones arranged in first plan according to aspects of the present disclosure. FIGS. 11A-D are in the context of a house 1102 or other structure and a protected porch, patio, or other area 1104. As shown in FIG. 11A a lighting and repellant dispersal system 100 containing three repellant dispersion ports 118 is provided in a V-shape over the area 1104. By arranging the system 100 such that the repellent dispersion ports 118 are spaced somewhat evenly over the area 1104, circular zones of coverage 1106 cover substantially all of the area 1004. There are some areas 1108 overlapped by two zones 1106 and one area 1110 overlapped by three zones 1106.

FIG. 11B is an overhead view of a plurality of repellent zones 1106 arranged in second plan according to aspects of the present disclosure. Here the system 100 is installed such that the repellent dispersion ports 118 are arranged at or near the perimeter or outer edge of the area 1104. There is less overlap in this configuration but each repellent dispersion port 118 may be effective within its own zone 1106 such that overlap is not needed. Additionally, the total area protected by the three repellent zones 1106 is larger and actually extends beyond the area 1104. As illustrated, using three repellent dispersion ports 118 at the perimeter of the area 1104 leaves a small area 1112 near the house 1102 that is relatively unprotected. However, the repellent zones 1106 that surround this area 1112 may provide a sufficient "wall of coverage" that pests do not enter the area 1112.

Referring now to FIG. 11C an overhead view of a plurality of repellent zones 1106 arranged in a third plan according to aspects of the present disclosure is shown. Here the system 100 is arranged in an X-pattern with four active repellent dispersion ports 118 arranged in a square offset from the outside of the area 1104. Here it can be seen that there are no "dead zones" and the protected zones 1106 extend beyond the edge of the area 1104 in every direction. Some areas 1108 are overlapped by two zones 1106 while others 1110 are overlapped by three, and others 1114 by four. It can also be seen that there are two idle repellent dispersion ports 118 on left and right sides of the area 1104. Thus, it should be appreciated that not all ports 118 may need to be active to provide desired repellent performance.

Referring now to FIG. 11D is an overhead view of a plurality of repellent zones 1106 arranged in third plan according to aspects of the present disclosure is shown. FIG. 11D illustrates another way of deploying the system 100 when only three dispersion ports 118 are provided (or active). In this application, the system 100 is installed in a "zig-zag" pattern over the area 1104 with the ports 118 spaced roughly in a line laterally across the area 1104. The zones 1106 provide full protection over the area 1104 including some double protected zones 1108 and one triple protected zone 1110 near the center of the area 1104.

It will be appreciated that any of the systems described herein (e.g., 100, 400, 700, 800, 900) can be adapted to cover a wide variety of areas. The protected areas are not necessarily square in every case (as in the examples of FIGS. 11A-D) but can have a wide variety of geometric shapes. Additionally, the areas protected may vary substantially in size but can be protected and lighted by inclusion of additional dispersion ports and/or use of multiple strings of dispersion ports, lights, and clip-on devices as disclosed herein.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method comprising:
 providing a first power cord;
 electrically connecting a plurality of heated repellant dispersal units to the first power cord, the plurality of heated repellent dispersal units increasing an evaporation rate of a repellant within the plurality of heated repellant dispersal units;
 arranging the power cord over an area to be protected by the repellant such that the entire area is infused by repellant from at least one of the heated repellent dispersal units, or is protected by intrusion from pests by an area infused by repellant from at least one of the heated repellent dispersal units;
 providing a plurality of light receptacles on the first power cord such that at least part of the area to be protected is lighted by the plurality of light receptacles;
 providing a second power cord;
 physically attaching the second power cord to the first power cord while keeping the first and second power cords electrically isolated; and
 powering the plurality of light receptacles via the second power cord.

* * * * *